June 25, 1929.　　J. S. GRAFSTRÖM　　1,718,689
ROAD GUIDE AND MAP DRAWING APPARATUS
Filed June 26, 1923　　6 Sheets-Sheet 1
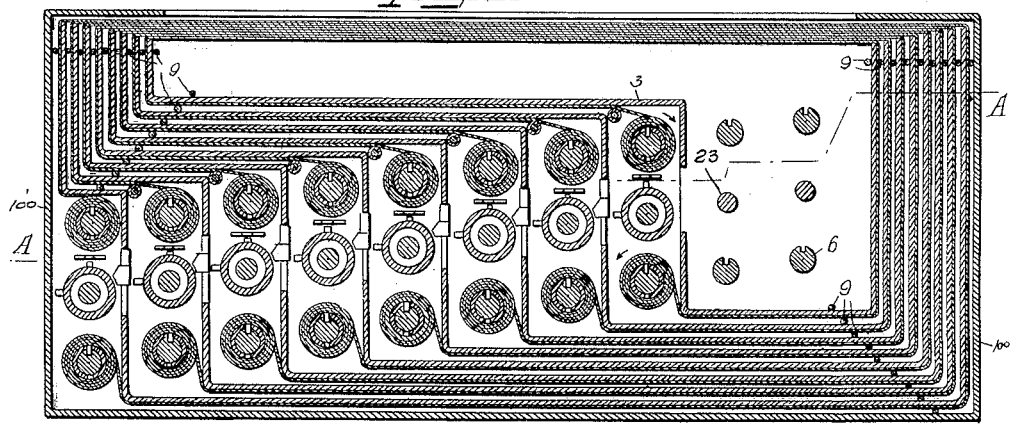
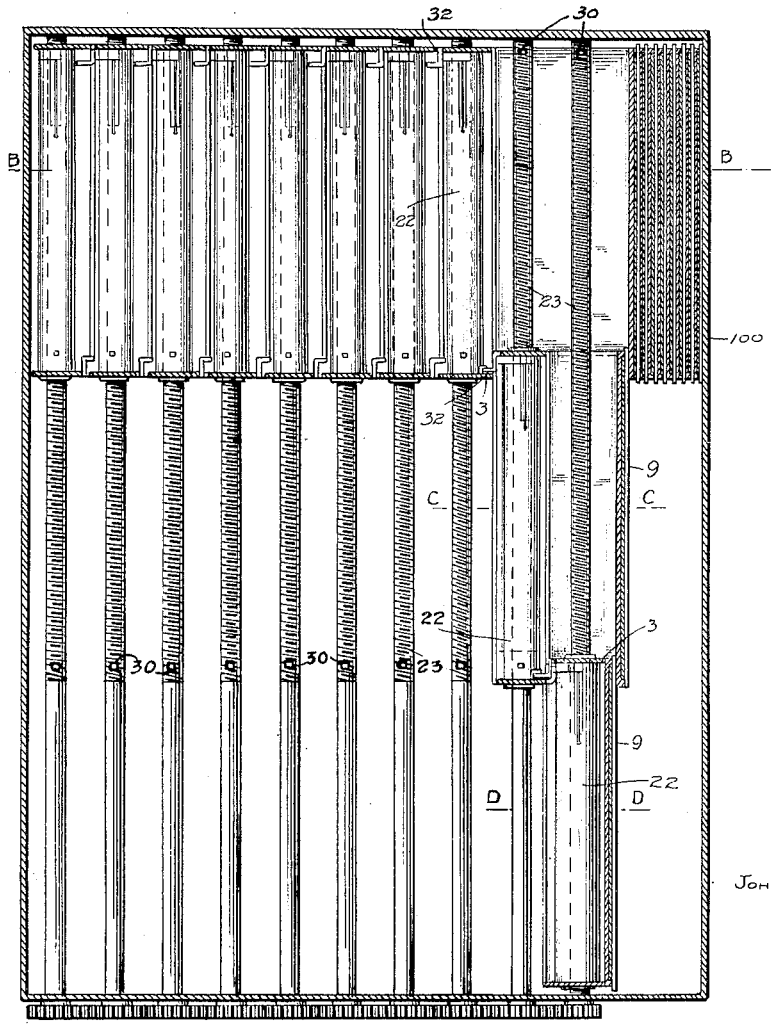
John Sigfrid Grafström
INVENTOR
BY
ATTORNEY June 25, 1929.　　　J. S. GRAFSTRÖM　　　1,718,689
ROAD GUIDE AND MAP DRAWING APPARATUS
Filed June 26, 1923　　　6 Sheets-Sheet 2
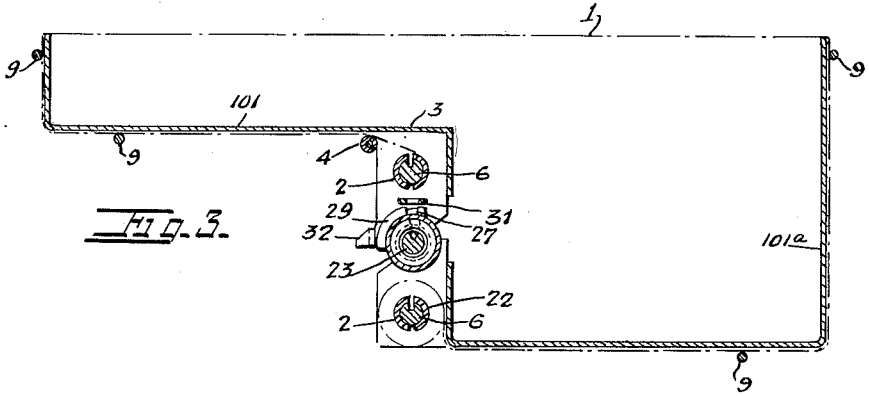
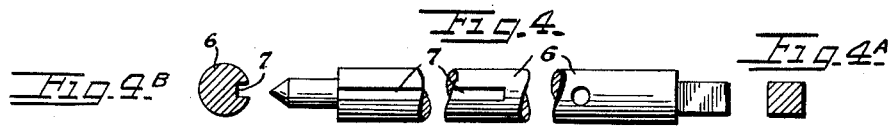
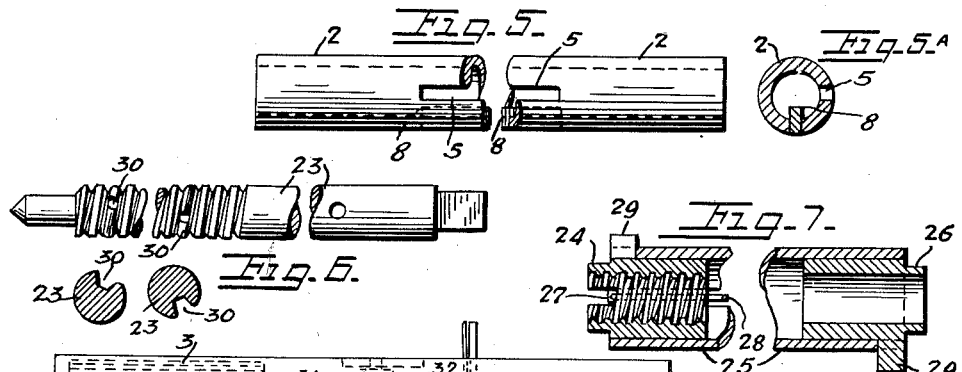
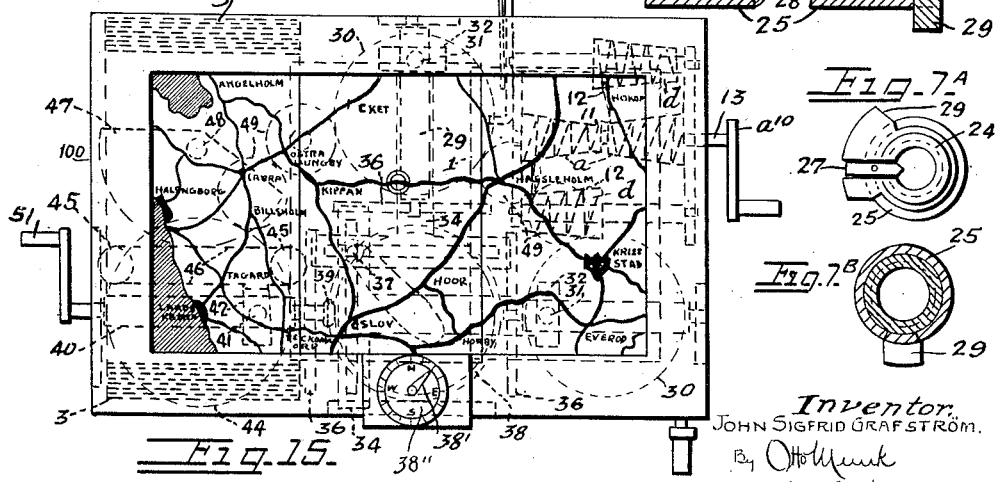
Inventor.
JOHN SIGFRID GRAFSTRÖM.
By Otto Munk
his Atty.

June 25, 1929.　　　J. S. GRAFSTRÖM　　　1,718,689
ROAD GUIDE AND MAP DRAWING APPARATUS
Filed June 26, 1923　　6 Sheets-Sheet 3
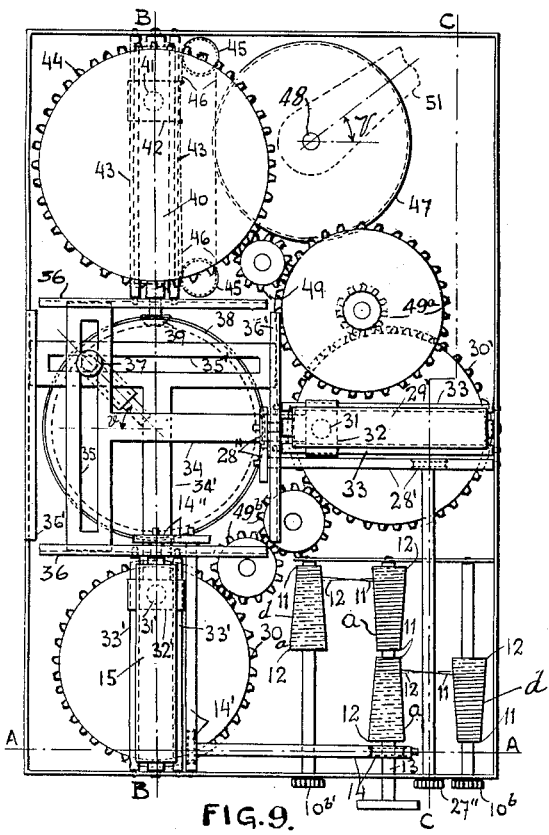
FIG.9.
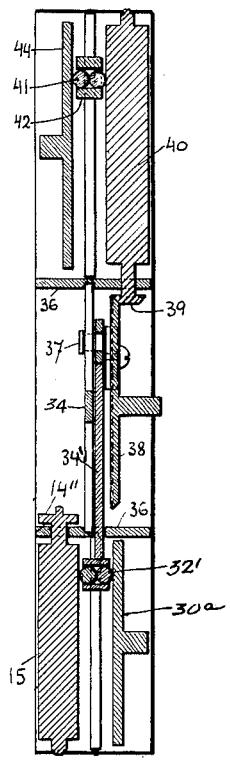
FIG.9.B.
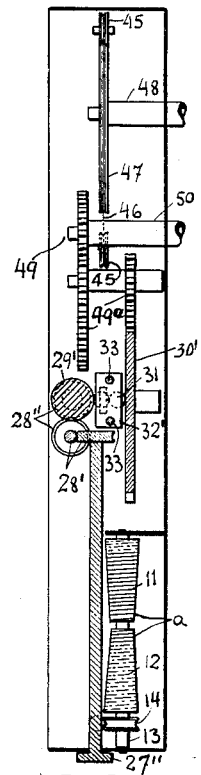
FIG.9.C.
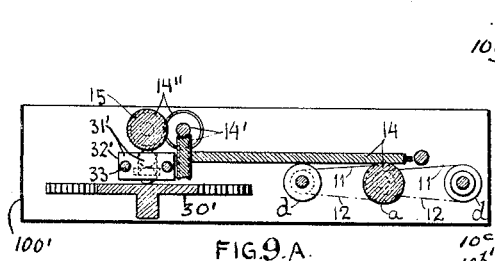
FIG.9.A.
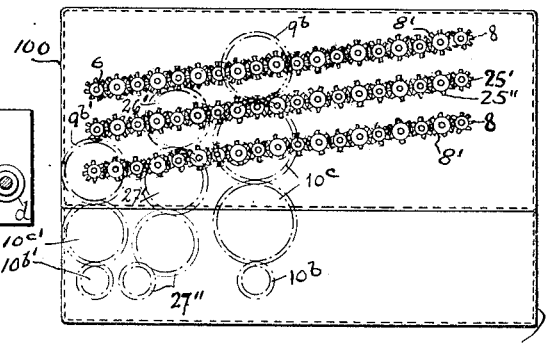
FIG.8.
John Sigfrid GRAFSTRÖM
INVENTOR:
his Attorney.

June 25, 1929.                J. S. GRAFSTRÖM                1,718,689
ROAD GUIDE AND MAP DRAWING APPARATUS
Filed June 26, 1923            6 Sheets-Sheet 4
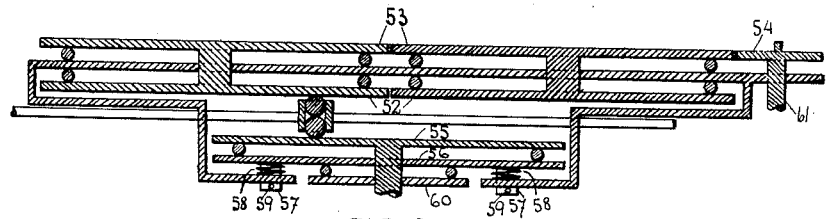
FIG.10.A.
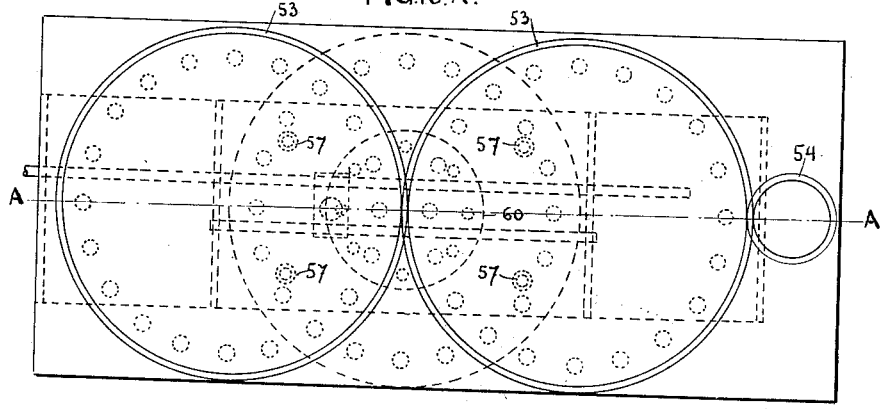
FIG.10.
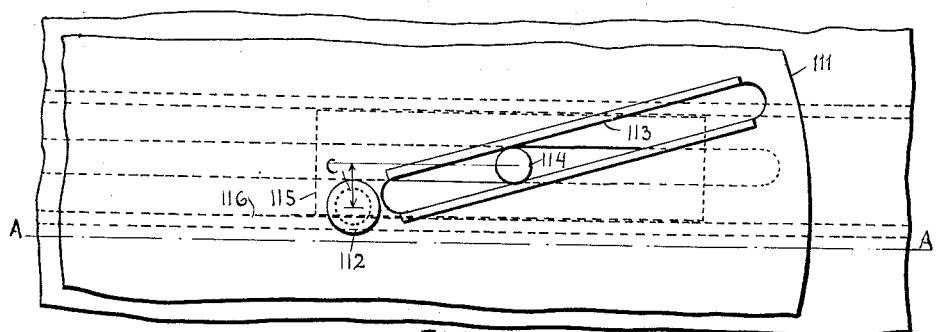
FIG.12.
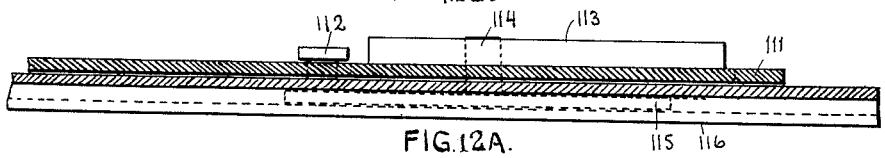
FIG.12A.
John Sigfrid Grafstrom
INVENTOR;
By
his Attorney.

June 25, 1929.   J. S. GRAFSTRÖM   1,718,689
ROAD GUIDE AND MAP DRAWING APPARATUS
Filed June 26, 1923   6 Sheets-Sheet 5

JOHN Sigurd GRAFSTRÖM
INVENTOR;
By
his Attorney.

June 25, 1929.  J. S. GRAFSTRÖM  1,718,689
ROAD GUIDE AND MAP DRAWING APPARATUS
Filed June 26, 1923  6 Sheets-Sheet 6
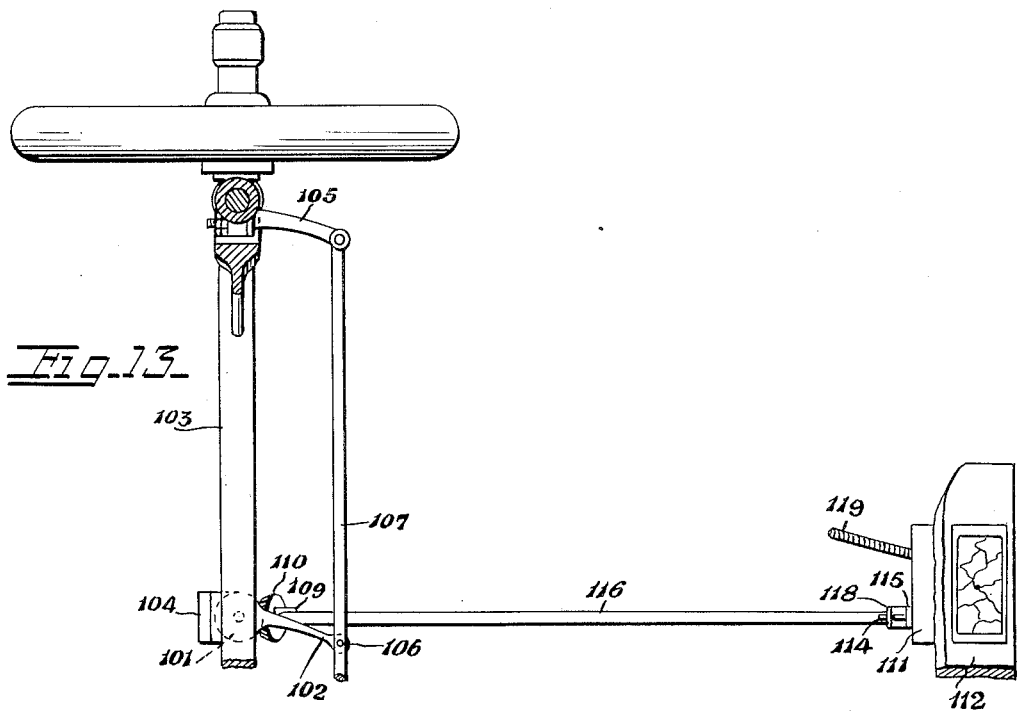
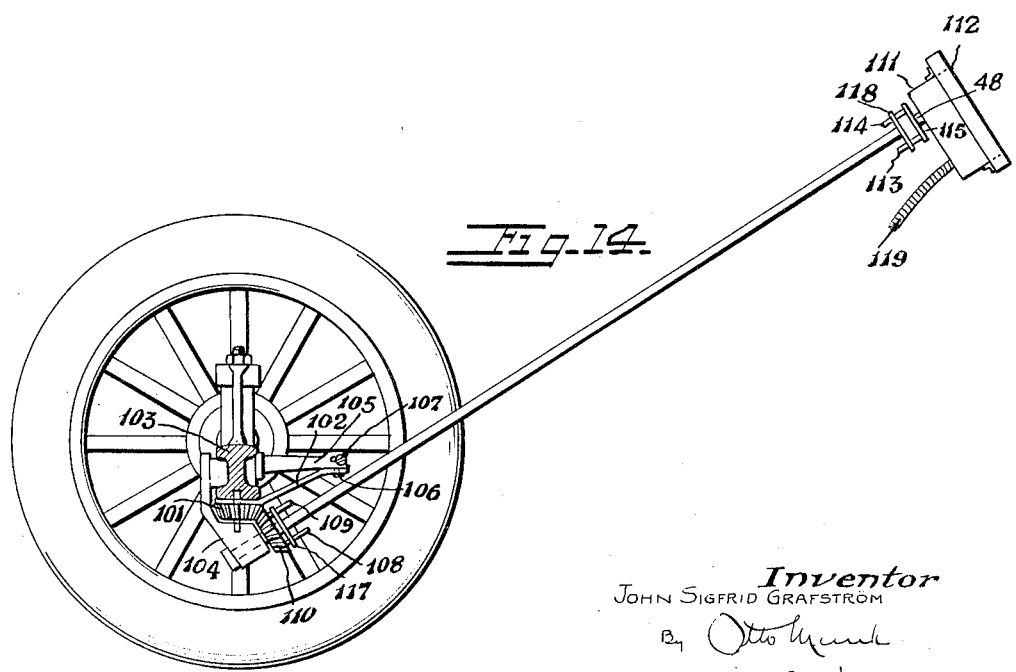
Inventor
JOHN SIGFRID GRAFSTRÖM
By
his ATTY.

Patented June 25, 1929.

1,718,689

UNITED STATES PATENT OFFICE.

JOHN SIGFRID GRAFSTRÖM, OF ULRICEHAMN, SWEDEN.

ROAD GUIDE AND MAP-DRAWING APPARATUS.

Application filed June 26, 1923, Serial No. 647,802, and in Sweden July 24, 1922.

My invention relates to a device to be used in cooperation with automobiles or similar vehicles for the purpose of drawing a map covering the area traveled or for following visually by means of a pointer and a given map the movement and route of said vehicle.

Briefly, the invention consists of a device having a fixed pointer element, and a paper area or map movable under the pointer, the movement of the paper area being controlled by mechanism operatively connected with the wheels of the vehicle. This mechanism is of such a design that two components of motion are imparted to the paper, one longitudinally and the other transversely of the vehicle, the resultant of the two having a length which is always equal to a constant factor times the speed of the vehicle, and a direction such that the pointer will trace a line which is a reproduction, on a fixed smaller scale, of the path traveled by the vehicle. Thus if the vehicle is proceeding along a straight path, the transverse component of motion of the paper becomes zero and the paper moves longitudinally in one direction. If the vehicle turns, the transverse component is brought into operation and during a complete 180° turn of the vehicle, the transverse component will reach a maximum and subside again to zero, while the longitudinal motion will become zero when the vehicle has turned 90° and reach a maximum in the opposite longitudinal direction when the vehicle has completed the 180° turn.

The various novel features of construction and the principle of my invention is fully described in this specification, clearly set forth in the appended claims, and illustratively exemplified in the accompanying drawings in which Fig. 1 is a front elevational cross-section along the line B—B of Fig. 2, showing a portion of the device, and particularly the paper-carrying means;
Fig. 2 is a cross-sectional plan view along the line A—A of Fig. 1;

Fig. 3 is a cross-sectional view through a single roll-holder of the nest of them shown in Fig. 1;
Figs. 4, 4A, 4B, 5, and 5A are details of the paper-carrying rolls;

Fig. 6 is a detail of the shaft along which a roll-holder travels;

Figs. 7, 7A, 7B are details of the sleeve carried by a roll-holder to guide it along the shaft shown in Fig. 6;

Fig. 8 is a diagrammatic front elevational view of the portion of the device shown in Fig. 1 together with the mechanism-carrying chamber;

Fig. 9 is a plan view of the mechanism-carrying chamber, with its cover removed;

Fig. 9A is a front elevational cross-section of the mechanism-carrying chamber, taken along line A—A of Fig. 9;

Fig. 9B and Fig. 9C are side elevational cross-sections along the lines B—B and C—C of Fig. 9 respectively;

Figs. 10 and 10A are plan and cross-sectional views of a modification of a portion of the device;

Figure 11A:
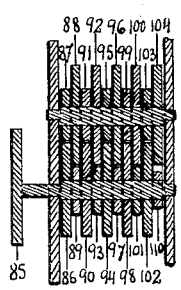
Fig. 11 is a plan view of a modified form of one of the friction discs constituting part of the mechanism.
Figure 11:
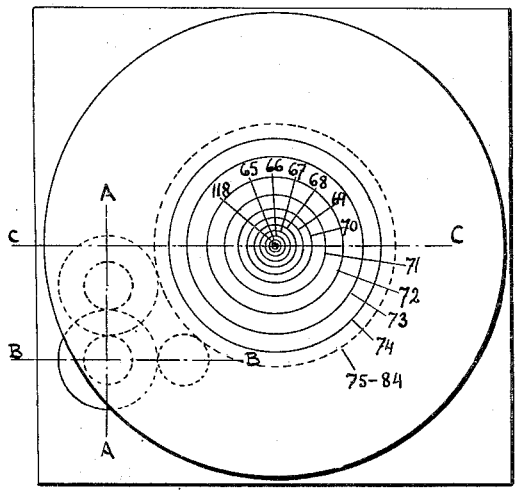
Figure 11B:
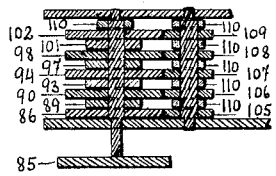
Figure 11C:
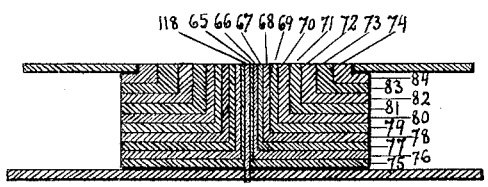

Figs. 11A, 11B, and 11C are cross-sectional views along lines A—A, B—B, and C—C of Fig. 11, respectively;

Figs. 12 and 12A are plan and cross-sectional views respectively of a portion of the device required for a modified form;

Fig. 13 is a plan view of my invention and its connection with the steering apparatus of a car;

Fig. 14 is a side elevational view of the same; and

Fig. 15 is a plan view of my invention showing a pointer and dial for indicating the movement of the vehicle.

Referring to Figs. 1 and 2, 100 denotes a substantially rectangular box or container provided with a plurality of transverse shafts or guides 23 which will be more fully described hereinafter. On each shaft is mounted a carrier member 3 which will hereinafter be termed a roll-holder.

Referring to Fig. 3, each roll-holder is adapted to carry two rollers 6. A continuous strip of paper 1 extends from one roller around two oppositely projecting wings of the roll-holder, and onto the other roller. The strip of paper 1 is shown as a dot-and-dash line in Fig. 3. Referring again to Figs. 1 and 2, there is thus a strip of paper extending nearly the entire length of the container 100 carried by each roll-holder. The container is of a width equal to almost three roll-holders placed end to end, as is clearly shown in Fig. 2 by the positions of roll-holders Nos. 1, 2, and 3. The wings of adjacent roll-holders are so designed as to allow the strips 1 to underlie each other, and in this way each of the roll-holders is free to move transversely on the shaft 23 upon which it is mounted, without interfering in any way (except as hereinafter described) with the other roll-holders. The map or paper area consists of these overlapping strips and is exposed over the top of the container, its length equal to nearly the length of the container, and its effective width equal to the entire width of the container.

I will now describe more fully one of the roll-holders. It comprises a substantially rectangular box (Fig. 3) having three vertically aligned bearings in its opposite ends, the center one for the shaft 23 and the other two for roller-shafts 6. A wing 101 projects in one transverse direction and amounts to an upright extension of the top wall of the box. Another wing 101$^a$ projects in the opposite transverse direction as a continuation of the bottom wall of the box. The lower wing 101$^a$ turns upward in a gentle sweep and extends vertically to the same height as wing 101. The strip of paper 1 extends from the upper roller 6 through an opening in the corner of the box directly under wing 101, over a roller member 4, and along the under side of wing 101. Following the upward curvature at the free end of the wing it extends horizontally across the space between the free ends of the wings and along the outside of the vertical portion of wing 101$^a$. It continues along the under side of the horizontal section of wing 101$^a$, through an opening in the lower corner of the box and onto lower roller 6. For guiding the roll-holders in their transverse movements and for spacing them one from another, guide pieces 9 are provided at spaced intervals along the wings, consisting of strip members joined to the flanges and spaced away from and parallel to the wing at that point. The span of the wings varies for each roll-holder, depending upon the position of the roll-holder in the container 100. Substantially, the wings extend out a distance which will bring their ends to the ends of the container when the roll-holder is mounted on its shaft 23. And a further variation in wing span is necessary to allow the roll-holders to nest as shown in Fig. 1.

A roll for carrying the paper is illustrated in Figs. 5 and 5A. It comprises a hollow cylindrical shaft 2 of a length equal to the length of a roll-holder, and having a longitudinal slot 5 into which the end of the paper is inserted for threading, and having also a longitudinal internal key 8, the purpose of which will be presently described.

Referring to Figs. 4, 4A, and 4B, the roller-shaft 6 is of a diameter to fit slidably through roll 2, and of a length to extend transversely across the whole container 100 and through bearings in opposite sides of the latter. The roller-shaft 6 is provided with a longitudinal groove or keyway 7 adapted to receive the key 8 to allow the rotary movement of roller-shaft 6 to carry with it roll 2 and yet allow roll 2 to slide freely along roller-shaft 6.

I shall now describe the means for driving the shafts 6 and thereby effecting the longitudinal movement of the paper area exposed across the top of the container 100.

The upper and lower rows of shafts 6 are each driven in unison by any suitable means. In Fig. 8 I have illustrated diagrammatically the ends of the shafts 6 each provided with a spur gear 8. In operative engagement with these spur gears I have mounted intermediate or idler spur gears 8′ which transmit the rotation of one shaft 6 to the adjacent one, and from that one to the next, and so on. On one of the shafts 6 I mount another gear, 9$^b$, which is driven by a gear 10$^b$ through intermediate gears 10$^c$. From the shaft 6 upon which gear 9$^b$ is mounted, equal rotation is imparted to the other shafts 6 in the upper row through the medium of the idler gears 8′. Similarly, the lower row of shafts 6 is driven by gear 10$^{b′}$, intermediate gears 10$^{c′}$, gear 9$^{b′}$ and idlers 8′. The gears 10$^b$ and 10$^{b′}$ are mounted on shafts extending into a lower container 100′ which has the same width and length as container 100 and underlies the latter. This lower container 100′ encloses the operative mechanism which will be described more fully hereinafter.

For the purpose of maintaining the lineal speed of the paper traveling from any upper shaft 6 to the corresponding lower shaft 6 independent of the thickness of the paper roll mounted on either shaft 6, a mechanism is provided whereby the speed of rotation of one of the rows of shafts 6 may be gradually increased and the speed of rotation of the other row of shafts 6 gradually decreased accordingly and thus the amount of paper which may at any time be rolled up on either shaft be compensated for. This mechanism comprises a differential gearing system which will be now described.

Referring to Fig. 9, the gears 10$^b$ and 10$^{b′}$ are shown mounted on parallel shafts. A third shaft 13 lies between the later two shafts and parallel to them. Four conical gear members $a$—$a$ and $d$—$d$ are carried by these three shafts, two, $a$—$a$, by the shaft 13 with their smaller ends adjacent to each other, and one, $d$, by each of the outside shafts. Each member $d$ is located on its shaft in a position which places its smaller end in alignment with the larger end of one of the members $a$—$a$ on shaft 13. Each of the members $a$—$a$ drives the aligned member $d$ on the outside shaft, that is, in Fig. 9, the upper member $a$ drives the left member $d$ and the lower member $a$ drives the right member $d$. The driving means consists of wire, preferably of the character of piano wire. All the members $a$—$a$ and $d$—$d$ are threaded externally. Two wires, 12, (shown dotted)

have each one end fastened to the larger ends of members *d—d* (marked 12 accordingly), and each wire spirals around its member *d* along the threads, and then extends over to the corresponding aligned member *a* and continues spiraling around the latter in the same direction, which is toward the larger end (marked 12) of *a*. At this larger end the other end of wire 12 is fastened. A similar set of wires 11 start at the smaller ends of *d—d*, spiral toward the larger ends and at the points where wires 12 lead off, extend across to members *a—a* and continue spiraling similarly toward the smaller ends of *a—a* where they are fastened. The effect of such winding is evident. When shaft 13 is turned at a uniform rate of speed, one wire 12 will wind up on one (e. g. the upper) member *a* and unwind from the corresponding member *d* (the left), driving the latter as it does so. At the same time the wire 11 on the other member *a* (the lower) will wind up on the latter and unwind from the corresponding member *d* (the right), driving the latter. Accordingly, though the speed of shaft 13 is constant, the left shaft will decrease its speed and the right shaft increase its speed. During this operation the remaining two wires 11 and 12 will naturally wind themselves up on the members *d—d* in the threads immediately left vacant by the driving wires 12 and 11 as the latter unwind from members *d—d*. Rotating the shaft 13 in the opposite direction will then have the opposite result. It follows that if the shaft whose speed is increasing is operatively connected with the roller-shaft 6 which is feeding paper, and the shaft whose speed is decreasing is operatively connected with the other roller-shaft 6 which is rolling up, the lineal speed of the paper can be maintained constant for a constant speed of shaft 13. In order to manipulate the member *a*, its shaft projects beyond the casing and carries a handle $a^{10}$.

The shaft 13 is driven by the worm shaft and worm gear 14—14. The worm shaft is in turn driven by the worm shaft and worm gear engagement 14'—14', the gear being mounted on the end of worm shaft 14. The worm shaft 14' is driven by a parallel roller member 15 (Fig. 9B) through spur gears 14''.

Having now described the means for effecting a longitudinal movement of the paper area by a rotation of shafts 6, the latter deriving their driving power ultimately from the roller member 15, I shall now describe how an effective transverse movement of the paper area is accomplished.

The shafts 23 are worm shafts. Fig. 6 illustrates one of these shafts. Near one end and about one-third of the length of the shaft from the other end, the shaft is provided with conical holes or recesses 30, the purpose of which will presently be explained. In Fig. 2, the positions of these recesses on the shafts is clearly shown.

Carried in the central bearings in the ends of each roll-holder is a sleeve member 22 (Fig. 3). Referring to Figs. 7, 7A, and 7B, the latter comprises a tubular member 25, in one end of which is snugly attached a nut member 24 internally threaded and adapted to engage with the threads on the shaft 23. In the other end of the tubular member 25 is a guide member 26 similarly attached to the member 25. The end of the guide member 26 and the end of the nut member 24 are of a smaller diameter than that of the member 25 and are adapted to bear in the bearings provided in the roll-holder. The nut member 24 and the guide member 26 are provided with lateral projections 29 adjacent their attenuated journal ends, and these projections extend laterally beyond the outside diameter of the tubular member 25. The nut member 24 is further provided with a radial bore adapted to retain a radially disposed pin 27. A longitudinally disposed spring 28 tends to hold this pin toward the axis of the nut member, so that when the pin 27 becomes aligned with one of the recesses 30 it will slip into the latter, and thereby lock the nut member (and accordingly, the entire tubular member) to the worm shaft.

Each roll-holder is provided with two lateral projections 32, both adjacent opposite ends of the roll-holder and substantially aligned with the shaft 23. One projection 32 extends toward one side and the other toward the other, and as will be readily understood when their function is explained, the two outermost roll-holders, namely, Nos. 1 and 10 (Fig. 2), lack the projections 32 which would extend outwardly from the nest of roll-holders.

The shafts 23 are all rotated simultaneously and at the same speed. Assuming all the roll-holders to start in the position occupied by Nos. 3–10 in Fig. 2, the pins 27 will all be in engagement with the recesses 30 at that end of the shafts 23, being held in such engagement by the springs 28. As a result, all the nut members 24 will be rotating with the shafts 23 and consequently no motion will be imparted to the roll-holders. Assuming now that roll-holder No. 1, due to the turning of the axis is given a slight impetus toward the direction of the other side of the container 100, so that the pin 27 will be forcibly ejected from its recess by the adjacent thread of the shaft 23, the nut member 24 will cease to be positively rotated by the shaft 23. Small lugs 31 (Fig. 3) are provided on the end wall of the roll-holder adjacent the projection 29 of the nut member 24. As the pin 27 is ejected, as described, these lugs 31 are adapted to receive the opposite end of the pin and hold the nut member thereby in locked position with the roll-holder. The result is that the relative rotation of the shaft 23 in the stationary nut member 24 will impart a longitudinal movement to the latter and the roll-holder will start to move slowly across the container 100. When it reaches its mid-position (the position occupied by No. 2 in Fig. 2), the projection 32 at its rear end will contact with the projection 29 on the guide member 26 of the adjacent roll-holder and impart to the latter the slight impetus which is necessary to eject the pin 27 of the adjacent roll-holder from its recess 30 into engagement with the lugs 31 and thereby lock the adjacent nut member to its roll-holder. As a result, the adjacent roll-holder will proceed across the container 100 in a manner similar to the first. When it in turn reaches its mid-position, the roll-holders will occupy the position illustrated in Fig. 2. At this instant of time, the pin 27 of roll-holder No. 1 has slipped into the other recess 30 of its shaft 23 and its movement has thus been stopped. Roll-holder No. 2, however, whose nut member 24 is still locked to it, will continue to move across the container and will presently impart to roll-holder No. 3 the impetus necessary to start the latter on a similar travel. The effective result of this is that the strips of paper carried by roll-holders 1, 2, and 3 will constitute an effective width equal to the width of the container 100, and movement of the entire paper area in a direction of this width is controllable by movement of the roll-holders, and hence ultimately, by the rotation of the shafts 23. If the shafts 23 are rotated in the opposite direction the roll-holders will move in the opposite direction in a manner similar to that described, and the paper area will be moved in the opposite lateral direction. If the shafts 23 are stationary, the paper area will have no lateral movement.

It is now clear that the paper area exposed across the top of the container 100 has two possible motions imparted to it, one longitudinal (effected by rotation of the shafts 6) and one lateral (effected by rotation of the shafts 23), and any possible combinations of these motions are possible by controlling the direction and speed of rotation of the shafts 6 and 23.

With this in view, it remains to explain how rotation of the shafts is controlled. The ends of the shafts 23 are provided with spur gears 25' (Fig. 8) and idler spurs 25'' and are driven through gear 26', intermediate gears 27', and gear 27'' in a manner similar to that hereinbefore described with reference to shafts 6. Referring to Figs. 9 and 9C, the shaft upon which gear 27'' is mounted is driven (through worm gear and shaft 28' and spur gears 28'') by roller member 29' parallel to worm shaft 28' and perpendicular to roller member 15. We thus have the two roller members 15 and 29' at right angles to each other controlling respectively the rotation of the shafts 6 and of the shafts 23.

I shall now describe how the roller members 15 and 29' derive their movement from the motion of the vehicle.

Referring to Figs. 9, 9A, 9B and 9C, the driving power from the wheels of the vehicle comes through shaft 50 (Fig. 9C) which extends up through the bottom of the auxiliary container 100' and terminates in a spur gear 49 lying in a plane parallel to the plane of the axes of roller members 15 and 29'. Through intermediate gears 49ª, mounted on the same jack-shaft, gear 49 imparts a rotation to a friction disc 30' which lies in the same plane, closely adjacent the roller member 29' with its axis intersecting the axis of the roller member 29'. A similar friction disc 30ª lies in a similar adjacent position relative to the roller member 15, and the disc 30ª is driven from the disc 30' through intermediate gears 49ᵇ. Guide rods 33 (Fig. 9C) lie parallel to roller member 29' between the latter and the disc 30', and on them is mounted a ball-carrier 32' containing two balls 31' contacting each other and projecting slightly through the sides of the carrier so that one contacts with the roller member 29' and the other with the friction disc 30'. The balls are free to rotate in any direction but are held by the carrier 32' in their relative positions. The carrier is slidable along the guide rods 33. It is possible by this friction drive between the disc 30' and the roller member 29' to vary the speed of the roller member by merely shifting the position of the carrier and the friction balls. Thus, when the carrier is situated immediately over the center of the disc 30', no motion at all is imparted to the roller member, whereas when the carrier is shifted to either side of the center, the speed of the roller will increase proportionately in either direction of rotation depending upon the side to which the carrier has been shifted.

The position of the carrier is controlled by movement of a T-shaped arm 34 which is attached to the carrier at the base of the T, the upright portion of the T extending parallel to the roller member 29' and the cross portion in the direction of the axis of the other roller member 15. The cross portion of the T is provided with a slot 35 adapted to receive a pin 37. Motion imparted to the pin will be transmitted to the T-member by the bearing of the pin against the inside walls of the slot, and inasmuch as the pin is free to slide lengthwise in the slot, only that component of the motion of the pin which is perpendicular to the cross portion of the T will be transmitted to the T-member. The extremities of the cross portion of the T rest in guide-ways 36 parallel to the upright portion of the T.

Between the other roller member 15 and the disc 30ª, a similar ball carrier 32″ is allowed to slide along guide rods 33′ parallel to the roller member 15. The carrier carries balls 31″ and operates in the very same manner as the other. A similar T-member 34′ controls the motion of the carrier along the guide rods, and is provided with a cross portion having a slot 35′. Guide-ways 36′ engage the extremities of the cross portion.

The T-members overlie each other and are movable independently of each other. The pin 37 is preferably provided with loose sleeves and extends through both slots; it is evident therefore that a rotary motion, or any motion of the pin, will have its perpendicular components transmitted to the T-members respectively, and hence to the carriers 32′ and 32″.

If the vehicle is moving in a straight direction, the pin 37 will remain stationary, and as a result, a certain relative speed of rotation will be imparted to the roller members 29′ and 15 by the friction discs 30′ and 30ª, and this relative speed will remain constant. The resultant motion imparted to the paper area will be along a straight line, and the speed of the motion along this straight line will depend directly upon the speed of the discs 30′ and 30ª; that is, upon the speed of the vehicle. The direction of motion along this straight line will depend upon the positions of the carriers 32′ and 32″, and for example, if one of the carriers is positioned over the center of its friction disc 30′ or 30ª, the direction of motion along the straight line will be a direction either parallel or perpendicular to the casing 100, because the component of paper area motion controlled by the friction disc whose carrier is centered will be zero.

I shall now describe how the direction of motion of the paper area is changed in accordance with a change of direction of the movement of the vehicle.

A third roller member 40 (Figs. 9 and 9B) is positioned with respect to a friction disc 44 in a manner similar to that described with reference to the other two roller members 29′ and 15. Guide rods 43 serve to guide a ball carrier 42 containing balls 41, in a manner similar to that described hereinbefore. This ball carrier however is not controlled by a T-member but by an endless chain 46 extending around pulleys 45. One side of this endless loop lies parallel and adjacent to one of the guide rods 43 and the ball carrier 42 is attached to this side of the loop. The other side of the loop is contacted by an engaging gear wheel 47 mounted on a shaft 48 which extends up through the auxiliary container 100′ in a manner similar to shaft 50. On this shaft 48 is fastened a lever or handle member 51, and motion of this handle member will rotate the gear 47, which in turn will engage with the endless chain and shift the ball carrier from one position to another.

The pin 37 is mounted on the back of a beveled gear wheel 38, which engages with a beveled gear 39 mounted on the end of the roller member 40. Rotation of the roller member 40 will therefore effect a turning of the wheel 38 with a consequent movement of the pin 37 in a circular path. Since a fixed position of the pin results in a constant relative speed of the rollers 29′ and 15, a movement of the pin results in a change of the relative speeds of 29′ and 15. Such a change of relative speeds results in a curved path of motion of the paper area, and the rate of change of relative speeds of 15 and 29′ is dependent upon the speed of pin 37, and consequently upon the position of carrier 42.

It will now be evident that the lever or handle member 51 may be actuated by the steering mechanism of the vehicle. If retained in a fixed position for straight movement (horizontal in Fig. 9), the carrier 42 will lie over the center of friction disc 44 and consequently no motion will be imparted to pin 37 with a resulting straight motion of the paper area. Similarly if the steering mechanism and lever 51 are retained in a fixed position for curved movement of the vehicle (as would be the case, e. g., in traveling around a perfectly circular track), the carrier 42 will locate over a point on disc 44 away from the center and impart a constant speed of rotation to roller member 40, and hence to pin 37. The magnitude of this constant speed will depend upon the amount the lever has been set away from the "straight" position. The sharper the curve, therefore, the greater the angle that lever 51 is set at, the greater the distance carrier 42 is from the center of the disc, and the greater the speed of rotation of the roller member 40; hence the greater the speed of movement of the pin 37, and the greater the rate of change of the relative speeds of roller members 15 and 29′; hence the sharper the curve traveled by the paper area.

It will be readily understood that in going along ordinary curved roads, the position of pin 37 will be constantly changing at varying rates, and for periods of time it will remain stationary. Thus if a car is moving north and turns east very gradually, and then continues east, the pin 37 will first remain fixed, then change its position slowly and remain fixed in its new position. If the turn east is made sharply, the pin will move from its first fixed position to its second fixed position more quickly. The pin will never return to its first fixed position again until the vehicle is again swung north.

The gear 38 may be operatively geared to a pointer 38′ placed preferably in some visible position on top of the apparatus, so that the pointer receives a turning motion equal to that of the pin 37. If a compass dial 38″ is placed under this pointer the direction of movement of the vehicle at any time will be indicated by the pointer 38', as shown in Figure 14. If desired, the pointer may be fixed and the dial actuated by the gear 38.

A beveled gear 101 supported on a lever 102 is mounted in a bracket bearing 104 which is carried by the forward axle 103 of the automobile. The lever 102 parallels the steering lever 105 and pivotally connected to the connecting bar 107 by means of a pin 106. A bevel gear 110 provided with projecting pins 108 and 109 is supported in the bracket 104 and held constantly in mesh with gear 101.

The map tracing device is mounted on the instrument board 112 of the car, and the lever 51 illustrated as a disc 115 carries two pins 113 and 114 and is fixed on the shaft 43. A bar 116 having two flanges 117 and 118 is placed between the gear 110 and the disc 115. The flanges 117 and 118 are provided with holes corresponding to the pins 108, 109, 113 and 114. A flexible connection 119 is made with the shaft 50 as well as with the rear axle of the automobile.

In operation, the device is arranged in such manner that when the automobile passes on a straight way, the balls 41 are in the center of the disc 44, while when a curve is passed, the lever 102 turns in the same angle as the steering wheels and the shaft 48 is turned a corresponding angle by means of the gear wheel 101, 110, the bar 116 and the disc 115, whereby the balls 41 are displaced a corresponding distance from the center of the disc 44.

Lying over the paper area I prefer to place a glass or similar cover having at its center either a hole or an indicating mark. When the apparatus is in operation, if map strips are used, the position of the vehicle will be indicated by the relative position of the map under the mark. Or the process may be reversed, and thus if plain paper strips are used, it is possible, by inserting recording means (such as a pencil) through the hole in the glass, to trace on the paper the path traveled.

Various mechanisms and gear combinations may be utilized in place of those described, without departing from the basic idea of the invention, viz, that the motion of the vehicle is divided into two perpendicular components which are transmitted to the map or paper area. The resultant motion of the paper will correspond both in direction and magnitude to the direction and magnitude of vehicle movement. Change of direction of the vehicle depends on its length and upon the turn imparted to the steering wheel. By suitable gearing and mechanisms, the angle of turn imparted to the steering wheel is made to control in direct proportion the rate of change of the magnitudes of the components referred to, resulting in a corresponding change of direction of the resultant paper area movement.

The paper area should be designed to have the largest possible number of strips of the greatest possible length, within a container of the smallest possible size.

It may occur, that when the curvature of the road traveled becomes very slight, the paper area will not respond, and this will be due to the fact that the carrier 41 will have moved such a slight amount from its central position that slippage will be too great to transmit any noticeable movement to roller 40. To overcome this, where it is necessary or desirable to record accurately curvatures of large radius, the gearing illustrated in Figs. 10 and 10A may be substituted for that now represented by disc 44 and roller 40.

In the Figs. 10 and 10ª just referred to, the friction disc 44 is replaced by friction disc 55 and the roller 40 is replaced by two aligned friction discs 52 which are mounted on shafts 52ª. On the other ends of these shafts are mounted spur gears 53 intermeshing, and adjacent to one of said gears is a spur gear 54 engaging with the latter. Gear 54 is mounted on a shaft 61 which actuates the wheel 38 either directly or through gearing.

The shafts of discs 52 and 55 are mounted in a framework 60 and between the discs 52 and this frame, and between the gears 53 and this frame are ball bearings 60$^b$ which serve to keep the discs aligned and facilitate easy turning. Between the back of disc 55 and the frame 60 is interposed a parallel auxiliary frame plate 56 through which the shaft extends, and ball bearings 60$^c$ similar to balls 60$^b$ are interposed between the disc and plate 56 for the purpose of guiding and insuring the true and smooth turning of disc 55. The auxiliary plate 56 is pressed toward the disc 55 by resilient means, and I have illustratively shown pins 57 attached to plate 56 and extending through the outside frame 60. Between the latter and the plate 56 and coiled around the pins are springs 58. Cotter pins 59 extending through pins 57 on the outside of the frame 60 limit the action of the springs 58.

Between the friction faces of disc 55 and discs 52 are the usual guides and the ball carrier, as heretofore described. It will be evident that whereas in the mechanism shown in Fig. 9, the rotation of roller 40 will vary directly with the distance of the ball carrier 42 from the center of driving disc 44, in the mechanism just described the movement of the carrier from the center of disc 55 will have a multiplied effect upon the turning of shaft 61. For example, if the carrier is slightly to the left (in Fig. 10A) of the center of disc 55, the rotation of the left disc 52 will be relatively slow, whereas if the carrier is moved to the extreme left periphery of disc 55 the rotation of the left disc 52 will be relatively large and the increase of its speed of rotation will have been far greater than in direct proportion to the movement of the carrier. In general, if N=speed of rotation of disc 52, $n$ the speed of rotation of disc 55, $r$ the distance the carrier is moved from the center of disc 55, R the radius of the discs, then $$N=\left(\frac{r}{R-r}\right)n,$$

whereas in the mechanism of Fig. 9, $N=rn$. For still greater sensitivity, one of the gears 53 (e. g. the left) may have its outside face made into a friction disc to correspond to 55. Then in cooperation with another ball-carrier, two more discs corresponding to the discs 52, and a shaft 61 actuated by these new discs, the shaft 61 may be made to respond even more sensitively to a slight motion of first disc 55, for the relation would then be $$N=\left(\frac{r}{R-r}\right)^2 n,$$

Still further sensitivity is possible by constructing the disc 44 of composite annular rings, each actuated at a different speed so that the linear velocity of any one ring will be greater than the linear velocity of a smaller one in a proportion greater than the ratio of their radii, as would be the case if the disc were in one piece. Such a construction is illustrated in Figs. 11, 11A, 11B, and 11C in which the friction disc comprises a nest of flanged annular members 65—74, one set of flanges ending on a common plane to form a friction surface, and the other set of flanges ending on a common cylindrical surface, 75—84. The latter flanges are provided with toothed peripheries and are driven each by a separate gear, the annulus of largest diameter being driven by the most rapidly moving gear. Such variable speed gears are driven as follows:

On a driving shaft is mounted a driving gear 85 and a series of alternately large and small gear members 86, 89, 90, 93, 94, 97, 98, 101, 102 (Fig. 11B). Gear 86 is keyed to the shaft and the others are loosely mounted on the shaft and each pair is integral or connected so as to rotate together. Thus 89 rotates with 90, 93 with 94, 97 with 98, and 101' with 102. The driving connection between gear 86, keyed to the shaft, and the other gear members is made through a parallel shaft having loosely mounted thereon another series of alternate large and small gear members adapted to intermesh with the gears on the driving shaft (Fig. 11A). Here too, each pair rotates together, i. e., 87 with 88, 91 with 92, 95 with 96, 99 with 100ª, and 103 with 104.

It is evident that gear 86 drives the pair 87—88, and gear 88 drives the pair 89—90, and so on, so that each successive pair is driven at an increased speed, the most rapidly rotating pair being 103—104. The latter gear 104 is meshed with the toothed periphery 84 of the largest annulus. Similarly the next slower-moving gear on the shaft of 104 (which will be 100ª) is meshed with annulus 82; and 96 with annulus 80, 92 with annulus 78 and 88 with annulus 76 (Fig. 11A). The intermediate annuli 83, 81, 79, 77, and 75 (Fig. 11C) are of course driven by the intermediate gears 102, 98, 94, 90, and 86 (Fig. 11A) through idler gears 105, 106, 107, 108, and 109 (Fig. 11B). By this construction it is possible to obtain rotations of the annular portions of the friction disc which increase in speed from the center of the disc to its periphery in a proportion greater than a direct radial proportion; accordingly a slight radial movement of a ball-carrier over such a disc will have a more sensitive effect than an equal movement over a disc as shown in Figs. 9 and 10.

When the modified forms of discs are used, the control of the displacement of balls 41 (Fig. 9) must be modified also so that the roller 40 will receive a rotational speed corresponding to the curvature of the road. Various ways of accomplishing this are possible, and in Figs. 12 and 12A I have illustratively shown one mode of construction. A lever 111 is pivotally mounted on a pin 112. A diagonally disposed slot 113 in the lever has upstanding lateral guide walls and the axis of the slot passes through the center of pin 112. A lug or pin 114 is adapted to fit into the slot and is mounted at the center of a plate 115 which is adapted to slide longitudinally between guides 116' in the member 116 to which the pin 112 is fixed. A small displacement of the lug 114 from its central position will produce a relatively large turning angle of lever 111 but the magnitude of this angle will decrease in proportion to an equal displacement of lug 114, the further the lug 114 is from the central position.

What I claim is:

1. A map tracing device for vehicles comprising a plurality of map areas, means for moving the map areas transversely or longitudinally or in both directions at any speed, said means being in operative connection with the vehicle wheels and automatically responsive to changes in linear velocity of the vehicle, and additional means adapted to be operatively connected with the vehicle steering control and cooperating with said first named means for automatically regulating the latter whereby the exposed map areas move responsively both as to speed and direction to the movements of the vehicle.

2. A map tracing device for vehicles comprising a plurality of map strips, a holder for each strip, said holders being adapted to nest to place the strips in overlying position, means cooperating with said holders for moving the holders successively in a transverse direction to expose successive strips in adjacent position, said strips being adapted to register with each other when in such exposed positions to form a map area, means cooperating with said strips for moving them longitudinally, both said means being in operative connection with the vehicle wheels and automatically responsive to changes in linear velocity of the vehicle, and additional means adapted to be operatively connected with the vehicle steering control and cooperating with said first and second named means for automatically regulating the latter whereby the exposed map area moves responsively both as to speed and direction to the movements of the vehicle.

3. A map tracing device for vehicles comprising a plurality of superimposable map strips, means for moving the strips successively to expose successive strips in adjacent positions, said strips being adapted to register with each other when in such exposed positions to form a map area, means for moving said strips longitudinally, both said means being in operative connection with the vehicle wheels and automatically responsive to changes in linear velocity of the vehicle, and additional means adapted to be operatively connected with the vehicle steering control and cooperating with said first and second named means for automatically regulating the latter whereby the exposed map area moves responsively both as to speed and direction to the movements of the vehicle.

4. A map tracing device for vehicles comprising a plurality of map strips, a holder for each strip, rollers in said holder either of which is adapted to feed, the other to roll up, opposite ends of said strip, a container for said holders, each holder being adapted to expose a portion of its strip across the top of the container whereby a composite map area is exposed, means in said container for moving the holders successively transversely across the container at variable speeds, second means in the container and cooperating with said rollers for leading the strips at variable speeds from one feeding roller to the corresponding receiving one, both said means being in operative connection with the wheels and automatically responsive to changes in linear velocity of the vehicle, and additional means operatively connected with the steering control of the vehicle and cooperating with both said first named means for automatically regulating the latter so that the exposed map area moves responsively both as to speed and direction to the movements of the vehicle.

5. In a map tracing device of the character described, the combination with a plurality of map strips adapted to register with each other to form a map area, of a holder for each strip, said holders being adapted to nest to bring the strips in overlying position, and means in operative connection with the vehicle wheels for moving the holders successively across the container.

6. A map tracing device as claimed in claim 5, including rollers in each holder either of which is adapted to feed, the other to roll up, opposite ends of said strip.

7. A map tracing device as claimed in claim 5, including rollers in each holder either of which is adapted to feed, the other to roll up, opposite ends of said strip, and means in operative connection with the vehicle wheels for moving the strip from one roller to the other.

8. In a map tracing device of the character described, the combination with a plurality of map strips adapted to register with each other to form a map area, of rollers for carrying opposite ends of each of said strips and differential transmission means in operative connection with the vehicle wheels for moving the strips from one set of rollers to the other at a speed which compensates for the changing diameters of the strip rolls on the rollers.

9. A map tracing device as claimed in claim 2, including rollers in each of said holders for carrying opposite ends of said strips, and said second named means comprising gears carried on the ends of said rollers, and a friction roller in operative connection with the vehicle wheels and in operative connection with said gears whereby a rotation of the friction roller will cause a rotation of the gears.

10. A map tracing device as claimed in claim 2, including rollers in each of said holders for carrying opposite ends of said strips, and said second named means comprising a set of gears carried on the ends of the rollers carrying corresponding ends of the strips, a second set of gears carried on the ends of the rollers carrying the other ends of the strips, a friction roller in operative connection with the vehicle wheels, and transmission means operatively interposed between the friction roller and the two sets of gears, whereby a rotation of the friction roller in either direction will cause opposite rotations of the two sets of gears.

11. A map tracing device as claimed in claim 2, including rollers in each of said holders for carrying opposite ends of said strips, and said second named means comprising a set of gears carried on the ends of the rollers carrying corresponding ends of the strips, a second set of gears carried on the ends of the rollers carrying the other ends of the strips, a friction roller in operative connection with the vehicle wheels and differential transmission means operatively interposed between the friction roller and the two sets of gears, whereby a rotation of the friction roller in either direction will cause a gradually increasing speed of rotation of one of the sets of gears and a gradually decreasing speed of rotation of the other of the sets of gears to compensate for the changing diameter of the strip roll winding onto or unwinding from each roller.

12. A map tracing device as claimed in claim 2, including rollers in each of said holders for carrying opposite ends of said strips, and said second named means comprising a set of gears carried on the ends of the rollers carrying corresponding ends of the strips, a second set of gears carried on the ends of the rollers carrying the other ends of the strips, a friction roller in operative connection with the vehicle wheels, and differential transmission means operatively interposed between the friction roller and the two sets of gears, whereby a rotation of the friction roller in either direction will cause a gradually increasing speed of rotation of one of the sets of gears and a gradually decreasing speed of rotation of the other of the sets of gears to compensate for the changing diameter of the strip roll winding onto or unwinding from each roller, said differential transmission means comprising three parallel shafts the outer two of which are operatively connected with the two sets of gears respectively and the central one of which is operatively connected with the friction roller, two juxtaposed conical pulleys carried by the central shaft, a conical pulley on each of the outer shafts in a position adjacent the oppositely facing pulley on the central shaft, said puleys being externally threaded, and transmission means between each central pulley and the adjacent outer pulley and adapted to wind up on said threads whereby a uniform rotation of the central shaft will rotate the outer shafts in opposite directions with relatively increasing and decreasing speeds.

13. A map tracing device as claimed in claim 2, including rollers in each holder for carrying opposite ends of said strips, and in which each holder comprises a substantially rectangular container, the top face of which is extended in one direction to form a wing turned upward at its extremity and the bottom face of which is extended in the other direction to form a wing turned upward at its extremity to the same height as the first named wing, said holder being provided with slots adjacent its top and bottom faces, whereby the strip is exposed across the gap between the extremities of the wings, the opposite ends of the strip extending around said extremities, under said wings, through said slots, and onto said rollers respectively.

14. A map tracing device as claimed in claim 2, including rollers in each holder for carrying opposite ends of said strips, and in which each holder comprises a substantially rectangular container, the top face of which is extended in one direction to form a wing and the bottom face of which is extended in the other direction to form a wing, said holder being provided with slots whereby the strip is exposed across the gap between the extremities of the wings, the opposite ends of the strip extending around said extremities, under said wings, through said slots, and onto said rollers respectively.

15. A map tracing device as claimed in claim 2, said first named means comprising parallel transverse shafts and in operative connection with the vehicle wheels, each of said holders being mounted on one of said shafts, and means carried by said holders for cooperating with said shafts whereby rotation of said shafts will produce relative transverse movement of the holders along said shafts.

16. A map tracing device as claimed in claim 2, said first named means comprising parallel transverse worm shafts in operative connection with the wheels of the vehicle, each of said holders being mounted on one of said shafts and being provided with a sleeve adapted to engage with the threads of the worm shaft whereby rotation of said shafts will produce relative transverse movement of the holders along said shafts.

17. A map tracing device as claimed in claim 2, said first named means comprising parallel transverse worm shafts in operative connection with the vehicle wheels, each of said holders being mounted on one of said shafts and being provided with a sleeve adapted to engage with the threads of the worm shaft whereby rotation of said shafts will produce relative transverse movement of the holders along said shafts, said sleeves being loosely mounted in said holders, and locking means carried by said sleeves and cooperating with said shafts when said holders are in their nested positions for normally locking the sleeves to the shafts whereby rotation of the shafts will produce relative rotation of the sleeves in the holders but will not produce relative transverse movement of the holders along said shafts.

18. A map tracing device as claimed in claim 2, said first named means comprising parallel transverse worm shafts in operative connection with the vehicle wheels, each of said holders being mounted on one of said shafts and being provided with a sleeve adapted to engage with the threads of the worm shaft whereby rotation of said shafts will produce relative transverse movement of the holders along said shafts, each shaft being provided with recesses and each sleeve being loosely mounted in said holder and being provided with a pin and resilient means for normally holding said pin in engagement with a recess when said holder is in its nested position, whereby the sleeves are normally locked to the shafts and rotation of the latter will produce relative rotation of the sleeves in the holders but will not produce relative transverse movement of the holders along said shafts.

19. A map tracing device as claimed in claim 2, said first named means comprising parallel transverse worm shafts and in operative connection with the vehicle wheels, each of said holders being mounted on one of said shafts and being provided with a sleeve adapted to engage with the threads of the worm shaft whereby rotation of said shafts will produce relative transverse movement of the holders along said shafts, each shaft being provided with recesses and each sleeve being loosely mounted in said holder and being provided with a pin and resilient means for normally holding said pin in engagement with a recess when said holder is in its nested position, whereby the sleeves are normally locked to the shafts and rotation of the latter will produce relative rotation of the sleeves in the holders but will not produce relative transverse movement of the holders along said shafts, said holders being provided further with projections adjacent said pins and adapted to engage said pins when the latter are withdrawn from said recesses whereby the sleeves are locked to the holders when unlocked from the shafts and rotation of the latter will produce relative transverse movement of the holders along said shafts.

20. A map tracing device as claimed in claim 2, said first named means comprising parallel transverse worm shafts in operative connection with the vehicle wheels, each of said holders being mounted on one of said shafts and being provided with a sleeve adapted to engage with the threads of the worm shaft, each shaft being provided with recesses and each sleeve being loosely mounted in said holder and being provided with a pin removably and normally in engagement with a recess when said holder is in its nested position, said holders being provided further with projections adjacent said pins and adapted to engage said pins when the latter are withdrawn from said recesses, whereby the sleeves are normally locked to the shafts but are locked to the holders when unlocked from the shafts, said recesses being conical whereby transverse movement of the holders will disengage said pins from said recesses, and said holders being further provided with lateral projections each adapted to engage with a projection on the adjacent holder when adjacent holders are in maximum relative transverse displacement, whereby holders in their nested positions are caused to move transversely in succession and not otherwise.

21. A map tracing device as claimed in claim 2, said first named means comprising parallel transverse shafts, each of said holders being mounted on one of said shafts, means carried by said holders for cooperating with said shafts whereby rotation of said shafts will produce relative transverse movement of the holders along said shafts, gears carried on the ends of said shafts, and a friction roller in operative connection with the vehicle wheels and in operative connection with said gears whereby a rotation of the friction roller will cause a rotation of the gears.

22. A map tracing device as claimed in claim 3, including two friction rollers in said caintainer in operative connection with the vehicle wheels and operatively interposed in the first and second named means, respectively.

23. A map tracing device as claimed in claim 3, including two friction rollers in said container operatively interposed in the first and second named means respectively, a friction disc adjacent each friction roller and operatively connected with the vehicle wheels, and friction means interposed between each friction disc and friction roller.

24. A map tracing device as claimed in claim 3, including two friction discs in operative connection with the vehicle wheels, two friction rollers overlying diameters of the discs respectively, said friction rollers being interposed in said first and second named means respectively, and friction means movable along said diameters and interposed between each friction roller and friction disc whereby movement of the interposed friction means will vary the direction and magnitude of the rotation imparted to the friction rollers by a rotation of the friction discs.

25. A map tracing device as claimed in claim 3, including two friction discs in said container in operative connection with the vehicle wheels, two friction rollers overlying diameters of the discs respectively, said friction rollers being interposed in said first and second named means respectively, and friction means movable along said diameters and interposed between each friction roller and friction disc, said friction means comprising balls, and carriers for said balls adapted to expose opposite portions of said balls to allow frictional contact between the balls and the disc on one side and between the balls and the friction roller on the other.

26. A map tracing device as claimed in claim 3, including two perpendicular friction rollers operatively connected with the vehicle wheels and interposed in the first and second named means respectively, and said additional means comprising a rotatable disc in the plane of said friction rollers and having its center at the point of intersection of their axes, means operatively connecting the disc with the vehicle steering control whereby rotation of the disc is responsive to the movement of the steering control, two perpendicular T-shaped cross-heads overlying said disc and having slotted cross-pieces, a pin on the disc projecting through both slots whereby a rotation of the disc will cause a movement of the cross-heads, and means carried by the free ends of the cross-heads for altering by the position of said free ends the relative speeds of rotation of the perpendicular friction rollers.

27. A map tracing device as claimed in claim 3, including two perpendicular friction rollers interposed in the first and second named means respectively, a friction disc adjacent each friction roller and operatively connected with the vehicle wheels, friction means interposed between each friction disc and friction roller and movable along a line parallel to the axis of the latter whereby movement of the interposed friction means will vary the direction and magnitude of the rotation imparted to the friction rollers by a rotation of the friction discs, and said additional means comprising a rotatable disc in the plane of said friction rollers and having its center at the point of intersection of their axes, means operatively connecting the disc with the vehicle steering control whereby rotation of the disc is responsive to movement of the steering control, two perpendicular T-shaped cross-heads overlying said disc and having slotted cross-pieces, the free ends of the cross-heads being connected respectively to the interposed friction means, and a pin on the disc projecting through both slots whereby a rotation of the disc will cause a movement of the cross-heads and hence of the interposed friction means, and whereby the relative speeds and directions of rotation of the perpendicular friction rollers are altered.

In testimony whereof, I have signed my name to this specification.

JOHN SIGFRID GRAFSTRÖM.